Nov. 11, 1941.   J. W. BROWN   2,262,164
METHOD FOR RECOVERY OF CADMIUM
Filed Aug. 3, 1940

INVENTOR.
JOHN W. BROWN
BY
Kwis Hudson & Kent
ATTORNEYS

Patented Nov. 11, 1941

2,262,164

UNITED STATES PATENT OFFICE 2,262,164

METHOD FOR RECOVERY OF CADMIUM

John W. Brown, Cleveland, Ohio

Application August 3, 1940, Serial No. 350,701

6 Claims. (Cl. 75—71)

This invention relates to improvements in method for recovery of cadmium. The invention has to do with the recovery of cadmium from scrap material. Available sources include cadmium scrap, cadmium dross, and cadmium-steel scrap. Heretofore recovery of the metal from such scrap materials has been effected by distillation in refractory retorts, the scrap being charged into such retorts, a condenser attached, the cadmium distilled off, and finally the retort opened up and the residual material cleaned out to make ready for the next charge. This prior method is subject to certain disadvantages, such as short life of the retorts which are relatively costly, fragile and easily cracked in cleaning out the residue, and the disadvantage that cadmium vapor is absorbed in the retort itself.

I have found that these difficulties can be avoided by the use of a retort made of relatively pure iron or steel. The common grade of cast iron cannot be employed because it has a melting point too close to the boiling point of cadmium. Sheet iron or steel and wrought iron have a sufficiently high melting point however and are not attacked appreciably by cadmium or cadmium vapor at the temperatures involved. At these temperatures however iron and steel oxidize rapidly if exposed to air or furnace gases. Taking these things into consideration I have found that an iron or steel retort separated from the air and from furnace gases by means of a refractory muffle serves the purpose excellently. As a protective means I introduce into the space between the retort and the muffle a gas containing substantially no free oxygen, preferably a reducing gas such as natural gas which combines with the oxygen that may pass through the muffle. The metal retort has the further advantage that iron and steel pipe connections can be made to it in such a way as to eliminate any possibility of cadmium vapor loss by leakage. I employ wrought iron pipe and pipe connections.

One of the objects of the invention is the provision of a method and apparatus for recovering cadmium which shall be effective and economical.

Another object is the provision of a method for the purpose stated which shall permit a furnace to be kept in almost continuous operation.

Still another object is the provision of means permitting the employment of metallic retorts.

A further object is the provision of means for inducing the flow of distillation vapors out of the retort where the temperature of the retort is maintained only slightly above the boiling point of cadmium.

Other objects and features of novelty will appear as I proceed with the description of that embodiment of the invention which, for the purposes of the present application, I have illustrated in the accompanying drawing, in which—

Figure 2:
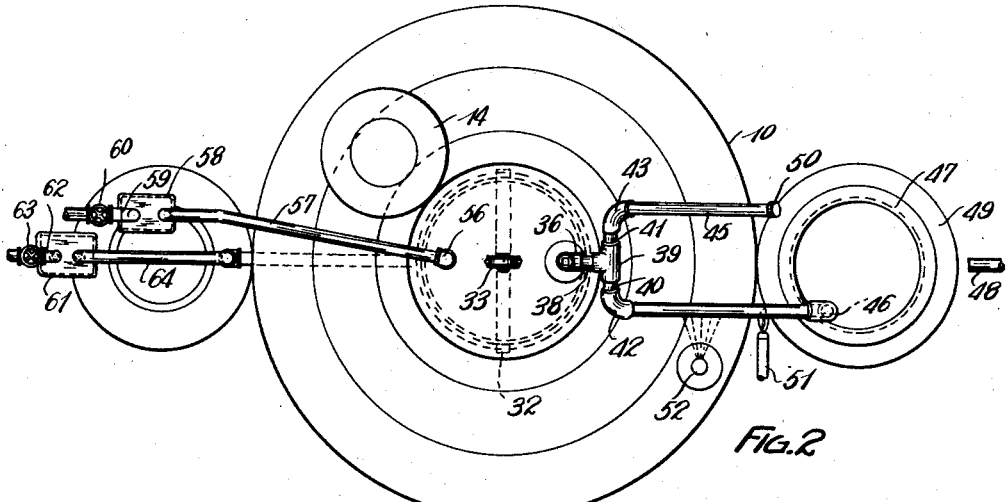
Fig. 2 is a top plan view of the same.

In the drawing 10 represents the outer refractory wall of a muffle furnace, this wall resting upon a refractory base 11 and being preferably cylindrical in shape. The furnace also comprises an inner cylindrical wall 12 concentric with wall 10 and an annular closure 13 between the two walls at the top of the furnace.

At one point above and in communication with the annular space between these walls there is a stack 14 to carry off the products of combustion which are supplied by a burner 15 through an opening 16 in wall 10, this burner using fluid fuel supplied through a pipe 17 with which is mixed air introduced under pressure by a blower 18. The flame may be controlled by a valve manipulated by a handle 19. The flame spirals upwardly in a path which encircles the wall 12 at least once before it emerges at the stack. By this means the wall 12 is heated to the desired extent.

Within the latter wall and spaced therefrom at all points I position a ferrous metal retort 20, preferably cylindrical in form. This retort is constructed of thin gauge sheet iron or steel with welded joints, and in some cases is reenforced with an internal pan 21. I may use metal from 12 gauge down to as thin as 26 gauge, although 16 or 18 gauge is generally preferable. The cost of such a retort is sufficiently low to warrant its being discarded after a single use. In most instances the top 22 of the retort is not attached until after a load of material to be treated is placed in the retort. However when the material to be treated is relatively fine I may weld the top 22 in place first and load the retort thereafter through one of the openings in the cover.

The retort rests upon the refractory base 11 which is provided with an approximately central pocket 23 and a communicating radial passage 24. An elbow 25 threaded into a hole in the bottom of the retort enters the pocket 23, and the pipe 26 projected inwardly through said passage may be threaded into the elbow 25. Thereafter the passage 24 is sealed with clay 9. A down-spout 27 connected with the outer end of pipe 26 extends into a pot 28 which is enclosed within a refractory box 29, the inner and bottom walls of which are spaced from the corresponding walls of the pot to provide a fire chamber 30 into which heating flame may be projected by a Bunsen burner indicated at 31. These connections when used serve for drawing off molten metal from the bottom of the retort. When they are used the reenforcing pan 21 may be omitted if desired, as its principal function is to reenforce the bottom of the retort when the latter is placed under the strain of a heavy charge of molten metal, as when the entire charge in the retort is to be reclaimed by the distillation process. In other cases however where it is not necessary to recover cadmium of high purity it is quite satisfactory to reclaim as much as possible by drawing off the melted metal.

The retort when loaded is quite heavy. I therefore make provision for handling it with a crane. For this purpose a loop 32 of heavy gauge strap metal is passed around and beneath the retort and is attached by suitable means to a block and tackle 33 supported from a crane, not shown.

34 is a length of pipe threaded into a fitting 35 mounted in the top 22 of the retort. At its upper end this pipe may carry a T-connection 36, one branch of which is closed by a plug 37, while the remaining branch is connected by means of a short length of pipe 38 with a second T 39 set at a slight angle to the horizontal. T 39 is connected through short lengths of pipe 40 and 41 with elbows 42 and 43 from which extend condenser tubes 44 and 45. These tubes are lengths of wrought iron pipe. Tube 44 is provided with a down-spout 46 which extends below the surface of molten metal in a pot 47 similar to pot 28. This pot is maintained at a temperature to keep the metal molten by flame from a Bunsen burner 48 directed through an opening in refractory box 49 similar to box 29, both of these boxes being vented at various points around their periphery as indicated in the drawing. Tube 45 may be closed at its upper end by a cap 50, and at other times may be provided with a down-spout similar to the down-spout 46 on tube 44.

One or more heaters such as Bunsen burners 51 are provided for heating either one or both of the tubes 44 and 45, and a water spray nozzle 52 may be provided as a convenient means for cooling either of these tubes.

The top 22 of the retort is also provided with a fitting 53 in which is clamped by means of a screw bushing 54 a length of wrought iron pipe 55 which extends down through the material in the retort to a point near the bottom of the latter. This pipe 55 is adapted to be connected by an elbow 56 with a horizontal pipe 57, the outer end of which is bent down and extends through the cover of a gauge 58. As illustrated herein this gauge consists of a bubbler, that is a glass jar filled part-way with water or other liquid. An inert gas is introduced into the bubbler by a pipe 59 with a constricted orifice below the level of the liquid. A hand valve 60 controls the flow of gas into the bubbler, and the bubbler shows visually the rate of flow of the gas.

A similar bubbler 61 receives gas from a pipe 62 with a constricted orifice beneath the liquid level, the rate of flow of gas into the bubbler being controlled by hand valve 63 and the gas from the bubbler flowing through pipes 64 and 65 into an annular space 66 between the muffle wall 12 and retort 20. A convenient and cheap gas to use in both instances is natural gas, but it should be understood that other gases may be employed if desired. The gas to the space 66 should be free from oxygen and should preferably be a reducing gas in order that it may absorb any oxygen which may be contained in products of combustion that leak through the wall 12. For the gas that is caused to enter the retort any gas which is inert to cadmium and iron will be satisfactory.

Figure 1:
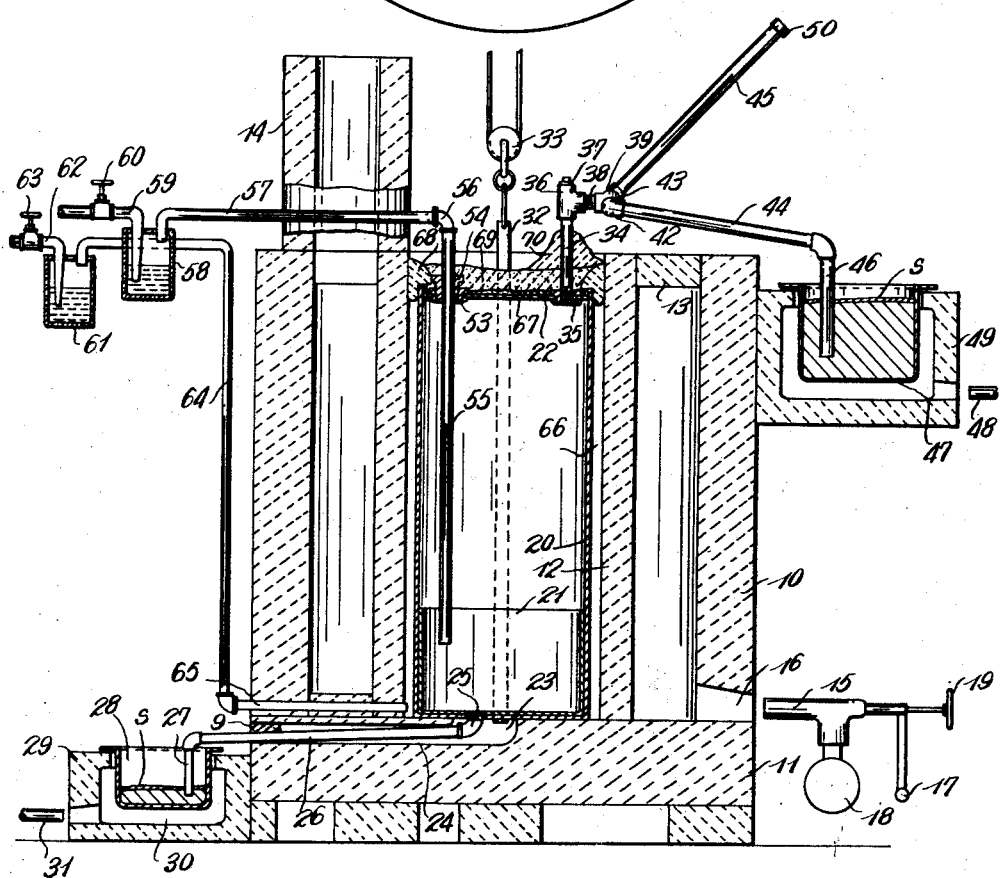
Fig. 1 is a diagrammatic vertical sectional view of apparatus which may be employed in connection with the invention.

When the retort has been loaded and closed I may apply to the exterior surfaces thereof, at least to the cover, a coating such that when the retort is exposed to heat a glaze will be formed tending to protect the metal of the retort from oxidation. This glaze material is indicated at 67 in Fig. 1 of the drawing and may consist of borax mixed with chromium cement.

When this coating has been applied and the retort is in place in the muffle, I seal the joint between the upper end of the retort and the muffle with a ring of clay 68. I also provide a thick layer of powdered refractory 69 over the top of the retort as insulation. Furthermore I insulate the greater part of pipe 34 with clay 70 to prevent vapors from condensing in that pipe.

*Operation*

The pipes 55 and 34 are mounted in the retort before it is lowered into place. Then the pipe 57 is connected with pipe 55 and the condenser tubes are connected with pipe 34. Also pipe 26 is connected with the bottom of the retort if molten metal is to be drawn off. The pipes 64 and 65 are installed permanently or semi-permanently.

The valve 63 is then opened and gas flows into the space 66, expelling the air in that space. Thereafter the clay seal 68 is applied and the annular space then filled with inert gas is thereby closed.

Now the burner 15 is turned on and the muffle begins to heat up. When the temperature gets somewhat above the melting point of cadmium some of the cadmium present in the charge melts and runs down through pipes 26 and 27 into pot 28. Where it is important to reclaim only substantially pure cadmium pot 28 is not used and no elbow fitting 25 is connected into the retort.

A sufficient amount of cadmium is placed in pot 47 and the pot heated to seal the lower end of pipe 46. Now after the temperature in the muffle has been raised to approximately the boiling point of cadmium distillation vapors begin to flow through pipe 34 into the condenser. Some of them flow into pipe 45 and are condensed, after which the condensate flows downwardly into pipe 44 and through that pipe and pipe 46 into pot 47. Other portions of the vapors flow directly into pipe 44 and are condensed, the condensate flowing down through pipe 46 into the pot.

In order that distillation vapors might flow unassisted into the condenser throughout the process it would be necessary to raise the temperature of the retort, at least part of that time, considerably above the boiling point of cadmium, which would be dangerously close to the melting point of the sheet steel or iron of which the retort is constructed. In accordance with my method however I use a temperature only slightly above the boiling point and induce flow of the vapors to the condenser by injecting inert gas into the retort at a point remote from pipe 34, that is at a point near the bottom of the retort, through pipe 55. This flowing gas carries the vapors along with it and out through the condenser. With the tube 45 in the position illustrated and with the cap 50 removed much of the gas will find an exit through pipe 45. The vapors will condense before they reach the open end of tube 45. Other portions of the vapors will condense in pipe 44. At times when the vapors are rising very rapidly it may be necessary to turn tube 45 down and attach a downspout similar to 46 to be projected beneath the surface of the molten metal in the pot. At such times the flow of gas into the retort may be cut down or stopped completely. The condenser tubes show by their color the rate of condensation, that is to say heat given up by condensation imparts a red glow to the tubes, and this color must be maintained within a given range because if the temperature of the condenser tubes gets too low the condensate may become solid and block the tubes, which would cause pressure to build up sufficient to burst the apparatus at some point, while on the other hand if the temperature gets too high condensation will not take place fast enough to prevent some of the vapors from being discharged into pot 47 and thence to the atmosphere. This latter condition is bad not only because of the loss of cadmium values, but also because cadmium vapors are extremely poisonous and injurious to the health of the workers. Consequently I provide means for controlling the temperature of the condenser tubes, which means may comprise one or more Bunsen burners 51 for playing flame upon the tubes and one or more spray nozzles 52 for cooling the tubes. A workman is in attendance at all times to handle this part of the equipment and to regulate the flow of gas through the bubbler. At the moderate temperatures which I employ the rate of vapor flow may be controlled within certain limits by the rate of flow of gas into the retort, that is by means of the control valve 60.

In both of the pots 28 and 47 the molten metal is delivered below the surface of a bath of molten metal which in practice I keep covered with a layer of slag indicated at S in the drawing. By this means oxidation of the metal and consequent loss on that account are kept at a minimum.

I desire it to be understood that although I have illustrated but two condenser tubes a greater number may be employed in cases where that appears to be advantageous. When one or more of these tubes is turned upwardly, as is the tube 45 in the drawing, such upwardly directed tube acts as a safety outlet for the retort in case the tubes which are turned down should become clogged up.

When all of the cadmium vapors have been abstracted from a retort, I cause its pipe connections to be broken and the retort to be lifted out of the furnace. Another retort previously loaded with fresh metal to be treated is then lowered into place and the pipe connections are made, so that the process may be resumed with very little delay. The withdrawn retort is permitted to cool, after which it with its contents may be disposed of as scrap.

Having thus described my invention, I claim:

1. A method for recovering cadmium from scrap metal, which comprises heating the metal in a closed sheet metal retort approximately to the boiling temperature of cadmium, introducing into the retort at a given point above any molten metal level a stream of gas inert to cadmium, drawing off the distillation vapors entrained by the gas at a point remote from said first named point, and condensing said vapors.

2. A method of recovering cadmium from scrap metal which comprises heating the metal in a closed sheet metal retort approximately to the boiling temperature of cadmium, introducing into the retort near the bottom thereof above any molten metal level a stream of gas inert to cadmium, drawing off distillation vapors entrained by the gas at the top of the retort, and condensing said vapors.

3. A method of recovering cadmium from scrap metal, which comprises heating the metal in a closed sheet metal retort to the melting point of cadmium, withdrawing the melted cadmium from the bottom of the retort, raising the temperature of the retort approximately to the boiling point of cadmium, introducing into the retort near the bottom thereof a continuous stream of gas inert to cadmium, withdrawing the distillation vapors entrained by the gas, and condensing them.

4. A method of recovering cadmium from scrap metal which comprises filling a ferrous sheet metal retort with the metal to be treated, closing the retort, placing it in a heated furnace, excluding oxygen from the heated surfaces of the retort, raising the temperature of the furnace substantially to the boiling point of cadmium, withdrawing the distillation vapors and condensing them, removing the retort with its spent charge of metal, placing in the furnace a new filled retort, and repeating the procedure.

5. A method of recovering cadmium from scrap metal, which comprises loading the metal into an open retort of ferrous sheet metal, welding a cover onto said loaded retort, heating the retort approximately to the boiling temperature of cadmium, excluding oxygen from the heated surfaces thereof, and drawing off distillation vapors therefrom.

6. A method of recovering cadmium from scrap metal which comprises heating the metal in a closed retort approximately to the boiling temperature of cadmium, introducing into the retort near the bottom thereof above any level of molten metal a stream of gas inert to cadmium, drawing off distillation vapors entrained by the gas at the top of the retort, controlling the rate of discharge of the vapors by controlling the rate of flow of the inert gas, and condensing the vapors.

JOHN W. BROWN.